May 19, 1936.  E. BOYKO  2,041,634

TRAP HOOK

Filed April 29, 1935

Emil Boyko, INVENTOR

BY Victor J. Evans & Co.

ATTORNEY

Patented May 19, 1936

2,041,634

UNITED STATES PATENT OFFICE 2,041,634

TRAP HOOK

Emil Boyko, Saskatoon, Saskatchewan, Canada

Application April 29, 1935, Serial No. 18,920

3 Claims. (Cl. 43—36)

The invention relates to fish hooks and more especially to trap hooks for fishing purposes.

The primary object of the invention is the provision of a hook of this character wherein, through the medium of a plurality of triggers, it is automatically operated, so that when a fish presses the triggers the same will operate the catching prongs for a sure catch of a fish, the hook in its entirety being of novel construction and positive of action.

Another object of the invention is the provision of a hook of this character, wherein the head thereof carries fins, these being swingingly supported and adapted to be manually pressed when extended for the setting of the hook for trapping purposes, the hook prongs being closed while the fins are retracted and released for the catching of a fish through the medium of pressible triggers operated by the jaws of the fish, when enticed by the bait on the hook.

A further object of the invention is the provision of a hook of this character which is comparatively simple in construction, thoroughly reliable and efficient in its purpose, strong, durable, easily set and automatically sprung when the victim closes his mouth on the bait, unsusceptible of being sprung by snags or weeds, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
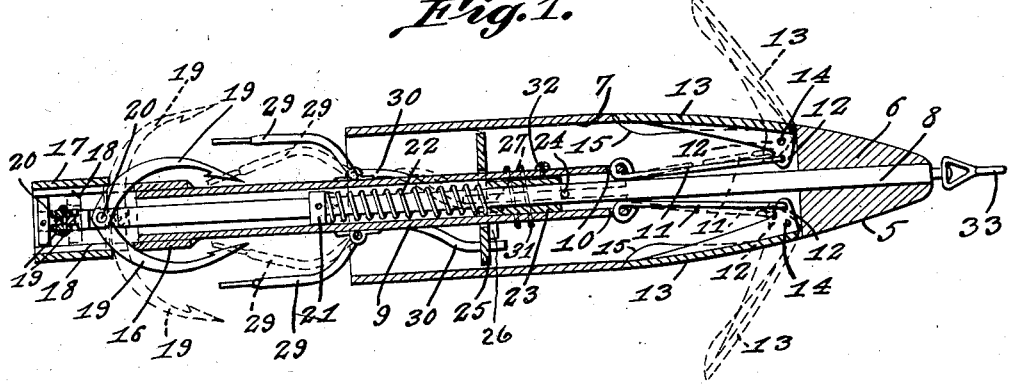
Figure 1 is a vertical longitudinal sectional view through the hook, showing by full lines the set position and by dotted lines the sprung position.

Referring to the drawing in detail, the hook comprises a head 5, the forward nose portion thereof being solid, as at 6, while the rear portion is hollow, as at 7, and this head may simulate a fish. The nose portion of the head 5 is forwardly tapered and has centrally fixed therein a relatively long rod 8 which extends through the hollow portion 7 and beyond the rear end of the head. Fitted over the rear portion of the rod 8 and extended into the hollow 7 of the head 5 is a tubular barrel 9 which, at its forward end, has suitable openings 10 for the loose connection of links 11 therewith, these being also loosely connected to ear portions 12 of swinging fins 13 which, at 14, are pivoted to the head and are adapted to fit in recesses 15 formed in said head and correspondingly shaped thereto. On movement of the barrel 9 in one direction, the fins 13 are extended from the recesses 15, as is shown by dotted lines in Figure 1 of the drawing, and on reverse movement of the barrel 9 the said fins 13 occupy the full line position shown in said Figure 1.

The barrel 9, at its rear end, carries a fixed sleeve 16 on which is a cap 17 closing the outer end of said sleeve. Extended through suitable slots 18 in the sleeve 16, these slots being preferably four in number and oppositely disposed, are curved catching prongs 19, these being pivoted, at 20, in pairs at right angles to each other, the pivotal connection 20 being had with the rod 8, and thus it will be seen that when there is relative movement between the rod and the said barrel 9, the prongs 19 will open and close, the said prongs being extended exteriorly of the barrel 9, for the catching of fish, when the same are automatically operated from normally closed position to spread or sprung position, the closed position being indicated by full lines and the sprung or spread position being indicated by dotted lines in Figure 1 of the drawing.

Carried by the rod 8 is a collar 21, against which rests a coiled expansion spring 22 which also rests against an adjustable sleeve 23 loose about the rod 8 and also loose within the barrel 9, the spring being designed to exert tension upon the barrel 9 for the automatic springing or spread of the prongs 19 when the barrel 9 is released from normalcy. Simultaneously with the springing or spread of the prongs 19, the fins 13 swing outwardly.

The sleeve 23 plays against a stop or retaining pin 24 carried by the rod 8.

Surrounding the barrel 9 is a ring 25, this being confined within the hollow 7 of the head 5 and joined by locking webs 26 with the sleeve 23 so as to rotate therewith. The barrel 9, at its inner end, is longitudinally slitted or provided with diametrically opposed slots 27 forming a clearance for the latching webs 26 of the ring 25 when the said webs 26 align with the slots 27 and thus allow movement of the barrel 9 with respect to the rod 8.

The barrel 9, next to the slots 27, has formed therein keeper notches 28, these opening into the said slots, and upon the turning of the ring 25 the webs 26 will enter the notches 28 and thus lock the barrel against relative sliding movement with respect to the rod 8 and in this manner the hook is set with the prongs 19 closed and the fins 13 swung inwardly into the recesses 15 therefor.

Swingingly supported upon the barrel 9 are depressible triggers 29, these having the turning arms 30 which are loosely engaged in the ring 25, so that on depressing the said triggers 29 the ring 25 will be rotated on the barrel 9 for disengaging the webs 26 from the notches 28 and thereby unlocking the said barrel 9 for its movement relative to the rod 8 and thus automatically springing the prongs 19 from closed to open position for the catching of a fish.

Figure 2:
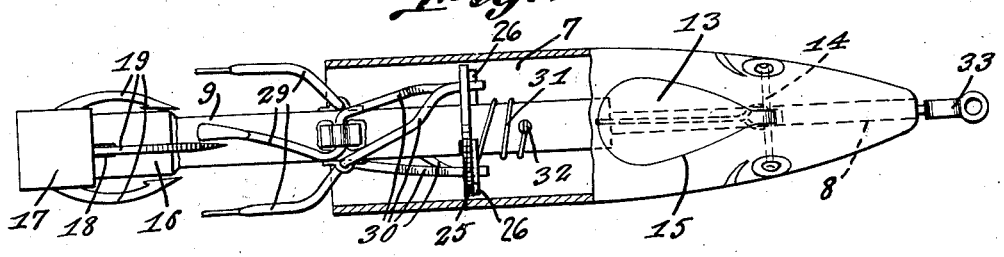
Figure 2 is a plan view partly in section.
Figure 3:
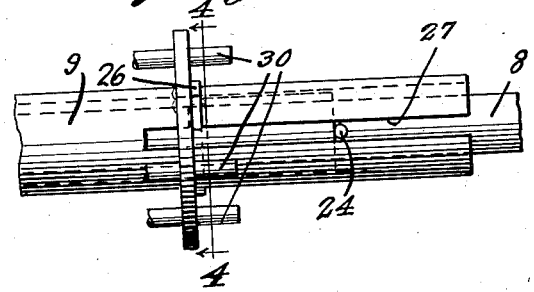
Figure 3 is a fragmentary detail view.
Figure 4:
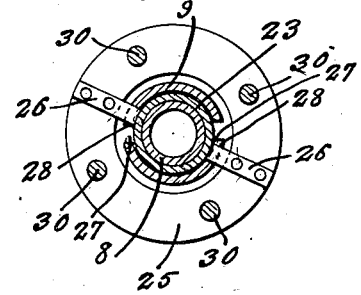
Figure 4 is a sectional view on the line 4—4 of Figure 3 looking in the direction of the arrows.

To the arm 30 of one of the triggers 29 is connected a coiled tensioning spring 31 which functions to urge the ring 25 in a rotating direction to have the webs 26 engage in the notches 28 and thus lock the barrel 9 in a set position, the coiled spring 31 being attached, at 32, to the barrel 9 and this spring being coiled about said barrel, as will appear from Figures 1 and 2 of the drawing.

In the operation of the hook, it is, of course, understood that normally the prongs 19 are closed and likewise the fins 13 are within the recesses 15 therefor, while the triggers 29 are extended so that when a fish attempts to acquire the bait on the hook the jaws of the fish will depress the triggers 29 and in doing this the barrel 9 will be freed or unlatched and due to the inertia of the barrel 9 and parts movable therewith when a pull is exerted on the line 33 the prongs 19 will be sprung or extended to catching position for the hooking of the fish as should be obvious.

When it is desired to release the caught fish, the fins 13 are pressed inwardly and in doing this the hook is reset as the barrel 9 will be pulled upon and the webs 26 will engage in the notches 28, locking the said barrel against relative movement with respect to the rod 8 and compressing the spring 22, so that the said barrel 9 will be tensioned for the automatic release thereof by the action of the triggers 29 before mentioned.

The nose of the head 5 carries a suitable line coupling 33 for the attachment of a fishing line thereto. Suitable bait is engaged upon the prongs 19 when the device is in use.

What is claimed is:

1. A hook of the character described comprising a head having a hollow portion, a rod centrally of said head, a barrel fitted upon said rod and movable relative thereto, catching prongs pivoted to the rod and extended through the barrel whereby on movement of the latter in one direction the prongs will be opened and on movement in the opposite direction said prongs closed, means for latching the barrel against movement when the prongs are in closed position, a plurality of triggers carried by the barrel and operating said means to release the barrel for the automatic opening of said prongs, and fins pivotally supported on the head and having connection with the barrel for the swinging of said fins on movement of the barrel.

2. A hook of the character described comprising a head having a hollow portion, a rod centrally of said head, a barrel fitted upon said rod and movable relative thereto, catching prongs pivoted to the rod and extended through the barrel whereby on movement of the latter in one direction the prongs will be opened and on movement in the opposite direction said prongs closed, means for latching the barrel against movement when the prongs are in closed position, a plurality of triggers carried by the barrel and operating said means to release the barrel for the automatic opening of said prongs, fins pivotally supported on the head and having connection with the barrel for the swinging of said fins on movement of the barrel, and tensioning means carried by the rod for said barrel.

3. A hook of the character described comprising a head having a hollow portion, a rod centrally of said head, a barrel fitted upon said rod and movable relative thereto, catching prongs pivoted to the rod and extended through the barrel whereby on movement of the latter in one direction the prongs will be opened and on movement in the opposite direction said prongs closed, means for latching the barrel against movement when the prongs are in closed position, a plurality of triggers carried by the barrel and operating said means to release the barrel for the automatic opening of said prongs, fins pivotally supported on the head and having connection with the barrel for the swinging of said fins on movement of the barrel, tensioning means carried by the rod for said barrel, and means operative upon the said latching means to urge the same to latching position when released by the triggers.

EMIL BOYKO.